(12) United States Patent
Shirai

(10) Patent No.: US 6,202,134 B1
(45) Date of Patent: Mar. 13, 2001

(54) PAGING PROCESSING SYSTEM IN VIRTUAL STORAGE DEVICE AND PAGING PROCESSING METHOD THEREOF

(75) Inventor: Hiroshi Shirai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/184,846

(22) Filed: Nov. 3, 1998

(30) Foreign Application Priority Data

Nov. 7, 1997 (JP) .................................... 9-322274

(51) Int. Cl.$^7$ ...................................... G06F 12/00
(52) U.S. Cl. .................. 711/159; 711/147; 711/170; 711/202; 711/203
(58) Field of Search .................. 711/147, 159, 711/170, 202–203

(56) References Cited

U.S. PATENT DOCUMENTS

| | | | |
|---|---|---|---|
| 4,758,944 | * | 7/1988 | Bartley et al. ................ 711/171 |
| 5,404,478 | * | 4/1995 | Arai et al. ................ 711/206 |
| 5,884,077 | * | 3/1999 | Suzuki ................ 709/105 |
| 5,897,660 | * | 4/1999 | Reinders et al. ................ 711/170 |

FOREIGN PATENT DOCUMENTS

| | | |
|---|---|---|
| 57-24081 | 2/1982 | (JP) . |
| 3-29041 | 2/1991 | (JP) . |
| 4-48355 | 2/1992 | (JP) . |
| 5-67059 | 3/1993 | (JP) . |
| 5-290001 | 11/1993 | (JP) . |
| 6-89252 | 3/1994 | (JP) . |
| 7-129518 | 5/1995 | (JP) . |
| 7-271739 | 10/1995 | (JP) . |
| 8-44687 | 2/1996 | (JP) . |
| 9-282227 | 10/1997 | (JP) . |

\* cited by examiner

*Primary Examiner*—Do Hyun Yoo
*Assistant Examiner*—Mehdi Namazi
(74) *Attorney, Agent, or Firm*—Young & Thompson

(57) ABSTRACT

A paging processing system in a virtual storage device of a computer composed of a plurality of computers connected directly or over a network including page data reception checking portion for notifying other computer which conducts page-out processing of the number of free physical pages of a physical memory in its own computer, page data reception/transmission portion for conducting processing of receiving page data from other computer and processing of returning received data, page data transmission checking portion for selecting a computer as a page data transmission destination based on the number of free physical pages notified by the page data reception checking portion, page data transmission/reception portion for conducting transmission processing of transmitting, to the other computer selected, page data of a virtual page to be paged out and reception processing when transmitted page data is returned, and page management portion for controlling each of the portion to manage a correspondence relationship between a virtual page and a physical page.

21 Claims, 7 Drawing Sheets

PAGING PROCESSING SYSTEM IN VIRTUAL STORAGE DEVICE AND PAGING PROCESSING METHOD THEREOF

BACKGROUND OF THE INVENTION

1. Field of the Invention

The present invention relates to a paging processing system in a virtual storage device enabling prevention of reduction in throughput of a computer by reducing a time required for paging to be conducted in large-scale calculation and a paging processing method thereof.

2. Description of the Related Art

In a conventional computer having a virtual storage device, it is possible to virtually assume and use memory space larger than a physical memory mounted on the computer. The mechanism is compressing useless memory space by allocating only the memory space being actually used out of virtual memory space to memory space of the physical memory.

Allocation from virtual memory space to memory space of a physical memory is conducted on the basis of a page which is a small unit obtained by dividing each memory space. In other words, out of virtual pages, a page being actually used is allocated to a physical page.

In this system, however, a physical memory might run out of pages when numbers of programs are executed simultaneously or when a program requiring enormous memory space is run.

Therefore, so-called page-out processing is conducted which is to once write a page that has not been used for the longest time at a certain point of time to an external storage device to free a page of a physical memory and allocate the page to a page that is to be used at the current time point to carry out execution.

Thereafter, when there arises a need of reference/modification of data of the paged out page, so-called page-in processing is conducted which is to read, if a free physical page exists, the page data retained in the external storage device into the physical page and re-allocate the physical page to a virtual page. If there exists no free physical page, another page is once paged out to make a free page in the physical memory and conduct page-in processing.

Conventional virtual storage control device is disclosed, for example, in Japanese Patent Laying-open (Kokai) No. Showa 57-24081. Proposed in the virtual storage control device recited in Japanese Patent Laying-Open No. 57-24081 is a technique of conducting data page-in/page-out from/to an external storage device as mentioned above.

In large-scale numerical computation processing or simultaneous running of numbers of programs, a virtual storage device needs more pages than those of a mounted physical memory to require page-in/page-out processing to be conducted frequently. Numerical simulation such as the finite element method, for example, requires an enormous array area to cause a shortage of a storage region, so that paging to an external storage device occurs frequently.

With conventional techniques, however, page-in/page-out processing consumes so much time that occurrence of many times of paging processing will considerably reduce throughput of the entire computer.

The reason is as follows. In conventional techniques, when a real storage region fails to accommodate a virtual storage region, part of data in the real storage region is temporarily saved in an external storage device to make a free area and the virtual storage region is allocated to the free area, and the data saved in the external storage device is returned to the real storage region as required. Although a magnetic disk or a magnetic drum device is used as the external storage device responsible for the data writing/reading, a rate of data writing/reading to/from these storage devices is extremely low as compared with a rate of data writing/reading to/from a memory and much time will be accordingly consumed for paging processing.

SUMMARY OF THE INVENTION

An object of the present invention is to provide a paging processing system in a virtual storage device which enables, in every computer having a virtual storage system connected over a network or connected directly, reduction in computer throughput to be prevented by reducing a time required for paging to be conducted for large-scale calculation which will cause a shortage of physical memory, and a paging processing method thereof.

Another object of the present invention is to provide a paging processing system in a virtual storage device enabling effective use of free memory resources in all the computers connected over a network etc. and a paging processing method thereof.

According to one aspect of the invention, a paging processing system in a virtual storage device of a computer system composed of a plurality of computers connected directly or over a network, comprises page data reception checking means for notifying other computer which conducts page-out processing of the number of free physical pages of a physical memory in its own computer, page data reception/transmission means for conducting processing of receiving page data from other computer and processing of returning received data, page data transmission checking means for checking a state of vacancy of a physical memory of other computer based on the number of free physical pages notified by the page data reception checking means to select a computer as a page data transmission destination, page data transmission/reception means for conducting transmission processing of transmitting page data of a virtual page to be paged out to the other computer selected and reception processing when transmitted page data is returned, and page management means for controlling each of the means to manage a correspondence relationship between a virtual page and a physical page.

In the preferred construction, the page data transmission checking means inquires of other computer about the number of free physical pages for paging out a physical page in its own computer, and the page data reception checking means notifies other computer which conducts page-out processing of the number of free physical pages of a physical memory in its own computer according to the inquiry.

In another preferred construction, the page data reception checking means notifies every other computer of the number of free physical pages of a physical memory in its own computer every fixed time period.

In another preferred construction, the page data transmission checking means compares states of vacancy of physical memories in other computers based on the numbers of free physical pages notified by the page data reception checking means to select one of the other computers having the largest number of free physical pages as a page data transmission destination computer.

In another preferred construction, the page data transmission checking means inquires of other computer about the number of free physical pages for paging out a physical page in its own computer, the page data reception checking means notifies other computer which conducts page-out processing of the number of free physical pages of a physical memory in its own computer according to the inquiry, and the page data transmission checking means compares states of vacancy of physical memories in other computers based on the numbers of free physical pages notified by the page data reception checking means to select one of the other computers having the largest number of free physical pages as a page data transmission destination computer.

In another preferred construction, the page data reception checking means notifies every other computer of the number of free physical pages of a physical memory in its own computer every fixed time period, and the page data transmission checking means compares states of vacancy of physical memories in other computers based on the numbers of free physical pages notified by the page data reception checking means to select one of the other computers having the largest number of free physical pages as a page data transmission destination computer.

In another preferred construction, the page data reception checking means, when notifying other computer which conducts page-out processing of the number of free physical pages of a physical memory in its own computer, notifies that no free physical page exists if the number of free physical pages is not more than a fixed value.

In another preferred construction, the paging processing system in a virtual storage device further comprises a page table for recording identification information of a paged out virtual page and a page-out destination, a received page table for recording the identification number of a computer which has transmitted page data by page-out processing, the number of a virtual page of the computer which has transmitted the page data, and the number of a physical page in its own computer which stores the transmitted page data, and a transmitted page table for recording the identification number of a computer which has received page data and the number of a virtual page whose page data has been transmitted, wherein in page-out processing, the page data transmission/reception means transmits, to other computer selected, the identification number of its own computer and the number of a virtual page to be paged out as well as page data and records, at the transmitted page table, the identification number of the computer having received the page data and the number of a virtual page whose page data has been transmitted, and the page management means records, at the page-out destination identification information corresponding to a paged out virtual page in the page table, information indicating that page data is stored in other computer.

In another preferred construction, in page-in processing, the page data transmission/reception means specifies other computer which stores page data based on page-out destination identification information of the virtual page paged out in the page table and the transmitted page table, makes a request to the specified other computer to return the page data, with the identification number of its own computer and the number of a virtual page corresponding to the page data whose return is requested designated, and transfers the page data returned to a free physical page in its own computer, as well as clearing the identification number of the computer having received the page data and the number of the virtual page whose page data has been transmitted in the transmitted page table.

In another preferred construction, page data reception/transmission means of the computer selected to receive the page data stores the transmitted page data in a free physical page of its own computer and records, in the received page table, the identification number of the computer which has transmitted the page data, the virtual page number of the computer which has transmitted the page data and the physical page number of its own computer which stores the page data.

In another preferred construction, page data reception/transmission means of the computer requested to return the page data searches the received page table for a combination of the identification number of the computer and the number of a virtual page corresponding to the page data whose return is requested contained in the request for return, transmits data stored at the corresponding physical page number in the received page table to the computer having made a request for return and after the completion of returning, clears the corresponding contents in the received page table.

According to another aspect of the invention, a paging processing method in a virtual storage device of a computer system composed of a plurality of computers connected directly or over a network, comprising the steps of notifying other computer which conducts page-out processing of the number of free physical pages of a physical memory in its own computer, checking a state of vacancy of a physical memory of other computer based on the notified number of free physical pages to select a computer as a page data transmission destination, transmitting page data of a virtual page to be paged out to the other computer selected, and managing a correspondence relationship between a virtual page and a physical page.

In the preferred construction, the paging processing method in a virtual storage device further comprising the steps of prior to the selection of the transmission destination computer, inquiring of other computer about the number of free physical pages for paging out a physical page in its own computer, and notifying other computer which conducts page-out processing of the number of free physical pages of a physical memory in its own computer according to the inquiry.

in another preferred construction, the paging processing method in a virtual storage device further comprising the step of notifying every other computer of the number of free physical pages of a physical memory in its own computer every fixed time period.

In another preferred construction, the paging processing method in a virtual storage device further comprising the step of comparing states of vacancy of physical memories in other computers based on the notified numbers of free physical pages to select one of the other computers having the largest number of free physical pages as a page data transmission destination computer.

In another preferred construction, the paging processing method in a virtual storage device further comprising the steps of inquiring of other computer about the number of free physical pages for paging out a physical page in its own computer, notifying other computer which conducts page-out processing of the number of free physical pages of a physical memory in its own computer according to the inquiry, and comparing states of vacancy of physical memories in other computers based on the notified numbers of free physical pages to select one of the other computers having the largest number of free physical pages as a page data transmission destination computer.

In another preferred construction, the paging processing method in a virtual storage device further comprising the steps of notifying every other computer of the number of free physical pages of a physical memory in its own computer every fixed time period, and comparing states of vacancy of physical memories in other computers based on the notified numbers of free physical pages to select one of the other computers having the largest number of free physical pages as a page data transmission destination computer.

In another preferred construction, the paging processing method in a virtual storage device further comprising the step of, when notifying other computer which conducts page-out processing of the number of free physical pages of a physical memory in its own computer, notifying that no free physical page exists if the number of free physical pages is not more than a fixed value.

In another preferred construction, the paging processing method in a virtual storage device further comprising a page table for recording identification information of a paged out virtual page and a page-out destination, a received page table for recording the identification number of a computer which has transmitted page data by page-out processing, the number of a virtual page of the computer which has transmitted the page data, the number of a physical page in its own computer which stores the transmitted page data, and a transmitted page table for recording the identification number of a computer which has received page data and the number of a virtual page whose page data has been transmitted, and further comprising the steps of in page-out processing, transmitting, to other computer selected, the identification number of its own computer and the number of a virtual page to be paged out as well as page data and records, at the transmitted page table, the identification number of the computer having received the page data and the number of a virtual page whose page data has been transmitted, and at the page-out destination identification information corresponding to a paged out virtual page in the page table, recording information indicating that page data is stored in other computer.

In another preferred construction, the paging processing method in a virtual storage device further comprising the step of, in page-in processing, specifying other computer which stores page data based on page-out destination identification information of the virtual page paged out in the page table and the transmitted page table, makes a request to the specified other computer to return the page data, with the identification number of its own computer and the number of a virtual page corresponding to the page data whose return is requested designated, and transfers the page data returned to a free physical page in its own computer, as well as clearing the identification number of the computer having received the page data and the number of the virtual page whose page data has been transmitted in the transmitted page table.

In another preferred construction, on the computer selected to receive the page data, the transmitted page data is stored in a free physical page of its own computer, and the identification number of the computer which has transmitted the page data, the virtual page number of the computer which has transmitted the page data and the physical page number of its own computer which stores the page data are recorded in the received page table.

In another preferred construction, the computer requested to return the page data searches the received page table for a combination of the identification number of the computer contained in the request for return and the number of a virtual page corresponding to the page data whose return is requested, transmits data stored at the corresponding physical page number in the received page table to the computer having made a request for return and after the completion of returning, clears the corresponding contents in the received page table.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
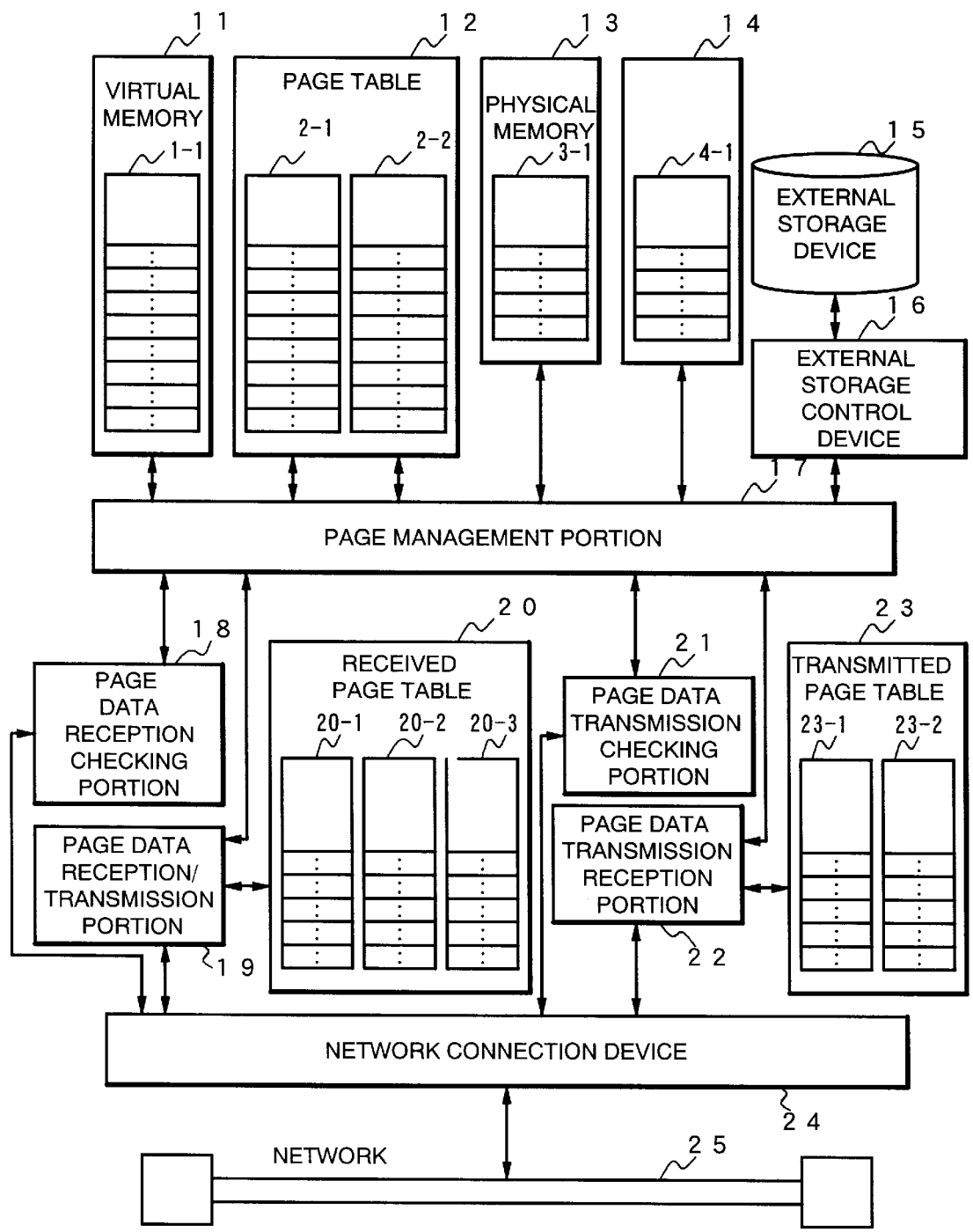
FIG. 1 is a block diagram showing system structure of a paging processing system in a virtual storage device according to an embodiment of the present invention.

FIG. 1 is a block diagram showing system structure of a paging processing system in a virtual storage device according to the embodiment of the present invention.

The paging processing system in a virtual storage device illustrated in FIG. 1 includes a virtual memory 11, a page table 12, a physical memory 13, a physical memory management table 14, an external storage device 15, an external storage control device 16, a page management portion 17, a page data reception checking portion 18, a page data reception/transmission portion 19, a received page table 20, a page data transmission checking portion 21, a page data transmission/reception portion 22 and a transmitted page table 23.

Computers having the above-described paging processing system are connected with each other over a network connection device 24 and a network 25. Computers may be directly connected with each other without the network connection device 24 and the network 25.

The virtual memory 11 is a virtual memory region having virtually assumed address space. On the other hand, the physical memory 13 is a memory region composed of substantial memory elements.

While the physical memory 13 is limited by the amount of memory element mounted on this computer, the virtual memory 11 has address space assumed to be much larger than that of the physical memory 13. Of this address space, only part of the space being actually used is allocated to the address space of the physical memory 13. Address assignment is conducted on the basis of a page which is a unit of several small divisions of memory space.

Out of virtual pages 1-1 in the above-described virtual memory 11, substance of data on a page being in use is stored at a physical page 3-1 on the physical memory 13 and a correspondence relationship between the virtual page 1-1 and the physical page 3-1 is recorded in the page table 12.

When a program is to be run on the computer, the virtual memory 11 is required. In this case, the virtual page 1-1 should be first allocated to a free physical page 3-1 on the physical memory 13.

The physical memory management table 14 is a table for recording a state of use of the physical page 3-1, in which a state of use/non-use of the physical page 3-1 is recorded at a status flag 4-1. By the reference to this status flag 4-1, therefore, a free physical page 3-1 is searched for and allocated to the virtual page 1-1.

Now assume a case where a plurality of programs are run simultaneously or a program which processes volumes of data is run on a computer to require large memory space. In this assumption, the region of the virtual memory 11 is assumed to be large enough to store these programs and data because it originally has virtually assumed address space. The physical memory 13, however, can not always ensure enough space because it is composed of substantial memory elements.

Assume here that more virtual pages 1-1 than the number of total physical pages held by the computer are used to cause a shortage of physical pages 3-1. In this case, page-out processing should be conducted for once saving a physical page 3-1 which has not been used for the longest time period somewhere to make a free physical page and allocating a virtual page to the free physical page. In conventional techniques, employed as a save area for use in page-out is the external storage device 15 such as a hard disk. Data of the physical page 3-1 is temporarily saved in the external storage device 15 through the external storage control device 16 to make a free physical page 3-1, thereby compensating for a shortage of pages.

When paged out data is again needed, page-in processing is conducted for again taking in data from the external storage device 15 into a free physical page 3-1.

If there exists no free physical page 3-1, page-in processing is conducted after a physical page that has not been used for the longest period of time is once paged out to make a free physical page 3-1.

Running volumes of programs which can not be accommodated in the physical memory 13 or a program requiring a large data region on the virtual memory 11, therefore, causes page-out and page-in processing to occur frequently, resulting in more drastic increase in a computer processing time than that in a case where no paging processing is conducted. Rate of data recording/reading to/from the external storage device 15 in particular is far lower than that of direct data recording/reading to/from a memory and most of a time required for paging processing is for data recording/reading to/from the external storage device 15.

The present invention therefore reduces a time for paging processing by directly paging to a free physical memory in other computer connected over the network 25 etc. without using the external storage device 15 as a paging destination.

The paging management portion 17 is a portion for managing a correspondence relationship between the virtual page 1-1 and the physical page 3-1 and managing a data paging destination in paging processing. While in conventional techniques, a paging destination is limited to the external storage device 15, the present invention allows a memory on a computer connected over the network 25 etc. to be a paging destination.

The page data reception checking portion 18 is a portion for checking a margin of the physical pages 3-1 in its own computer at the time of page data reception from other computer connected to the network 25.

The page data reception/transmission portion 19 is a portion for conducting reception processing at the actual reception of page data from other computer and returning processing of received data.

The received page table 20 is composed of a transmission side computer ID 20-1, the received page number 20-2 and the physical page number 20-3. The transmission side computer ID 20-1 is a field for recording an identification ID on a network etc. of a computer which has transmitted page data. The received page number 20-2 is a field for recording the number of the virtual page 1-1 of the computer which has transmitted the page data. The physical page number 20-3 is a field for recording the number of the physical page 3-1 in its own computer which stores the transmitted page data.

The page data transmutation checking portion 21 is a portion for checking a state of vacancy of the physical memory 13 in other computer connected to the network 25 to select a computer as a page data transmission destination.

The page data transmission/reception portion 22 is a portion for conducting transmission processing at the transmission of page data of a virtual page to be paged out from its own computer to other computer connected to the network 25 and reception processing of transmitted page data.

The transmitted page table 23 is composed of a reception side computer ID 23-1 and the transmitted page number 23-2. The reception side computer ID 23-1 is a field for recording an identification ID on the network etc. of a page data transmission destination computer. The transmitted page number 23-2 is a field for recording the page number of a virtual page to be sent.

The network connection device 24 is a unit to serve as an interface when the computer sends and receives data to and from other computer over the network etc.

The network 25 is a unit for connecting computers for enabling the computers to send and receive data to and from each other.

Operation of thus structured embodiment will be described with reference to FIGS. 1 to 6.

(a) Operation in Page-out Processing

At the allocation of the virtual page 1-1 to the physical page 3-1, the page management portion 17 refers to the status flag 4-1 in the physical memory management table 14 to search for a physical page not in use. When none of the physical pages 3-1 is being not in use, however, a physical page whose updating/reference has not been made for the longest time period looking back from the current time point is paged out. While in conventional techniques, a page-out destination is the external storage device 15, in the present invention, page-out is conducted to a free physical memory in other computer connected over the network etc.

In the following, operation in the page-out processing will be described in detail with reference to FIGS. 1 and 2.

First, the page data transmission checking portion 21 issues, to computers connected to each other over the network 25 etc., a command to inquire how many free physical pages 3-1 it has through the network connection device 24 (Step 201).

Upon receiving the command, each computer on the network 25 counts the number of free physical pages to respond to the computer which has made the inquiry and the present processing waits for this response to arrive (Step 202).

The page data transmission checking portion 21 compares the numbers of free physical pages informed by the respective computers to select a computer that has the largest number of free physical pages (Step 203).

When the number of free physical pages is larger than "0", the routine proceeds to the processing of transmitting page data to the selected computer (Step 205 and the following steps); otherwise the routine proceeds to the processing of storing page data in the external storage device 15 as is done in conventional art (Step 210 and the following steps) (Step 204).

The data transmission/reception portion 22 transmits page data to the computer selected at Step 203 through the network connection device 24. On this occasion, the portion 22 at the same time transmits an ID on the network of its own computer and the page number of a virtual page to be paged out. These are used for identification next time for having data returned from the computer which has received the page data (Step 205).

Then, the data transmission/reception portion 22 records an ID on the network 25 of the computer having received this page data at the reception side computer ID 23-1 in the transmitted page table 23 (Step 206).

The data transmission/reception portion 22 further records the page number of the paged out virtual page at the transmitted page number 23-2 in the transmitted page table 23 (Step 207).

The page management portion 17 records, at the corresponding device number 2-2 in the page table 12 corresponding to the paged out virtual page, the number indicating that the paged out data is retained in other computer connected over the network 25 (Step 208).

Next, when the number of free physical pages of the computer connected over the network is "0" at Step 204, the page management portion 17, as is done in conventional art, records page data in the external storage device 15 through the external storage control device 16 (Step 210).

The page management portion 17 furthermore records, at the corresponding device number 2-2 in the page table 12, the number indicating that the paged out data is retained in the external storage device 15 (Step 211).

Paging out the virtual page 1-1 frees its corresponding physical page 3-1. The page management portion 17 changes the status flag 4-1 in the physical memory management table 14 corresponding to the freed physical page 3-1 into a flag indicative of being not in use (Step 209).

(b) Operation in Page-in Processing

Reference/updating of paged out data requires page-in processing of reading the data and re-allocating the same to the physical page 3-1. In the following, operation in page-in processing will be detailed with reference to FIGS. 1 and 3.

For accessing the paged out virtual page 1-1, data of this page needs to be read again into the physical page 3-1. Therefore, for ensuring the physical page 3-1, first search the status flag 4-1 in the physical page management table 14 for a physical page not in use (Step 301).

At this time, if there exists no physical page being not in use, conduct the above-described page-out processing to ensure a free physical page.

Next, with reference to the corresponding device number 2-2 in the page table 12 corresponding to a virtual page to be paged in, determine whether paged out data exists in the external storage device 15 or exists in a physical memory of other computer connected over the network 25 (Step 302).

If the paged-out data exists in the external storage device 15, read the paged-out data from the external storage device 15 as is done in conventional art (Step 311).

On the other hand, when the data exists in a computer connected over the network, read the paged out data from the computer. In the following, procedures of this processing will be described.

Out of the computers connected over the network, specify a computer which stores target page data. The page data transmission/reception portion 22 searches the transmitted page number 23-2 in the transmitted page table 23 for the same number recorded as the virtual page number to be paged in. In the reception side computer ID 23-1 corresponding to the searched number, an ID of the computer which retains the paged out data is registered (Step 303).

The page data transmission/reception portion 22 issues a command through the network connection device 24 to the computer having the ID found at the above step to return the paged out data. This command contains the ID of its own computer and the number of the virtual page corresponding to the page data whose return is requested (Step 304).

Wait for the data to be returned from the other party's computer (Step 305).

Transfer the returned data to the free physical page 3-1 found at Step 301 (Step 306).

Furthermore, change the status flag 4-1 in the physical memory management table 14 corresponding to this physical page into the flag indicative of being in use (Step 307).

Record the page number of the physical page 3-1 at the corresponding page number 2-1 in the page table 12 in order to make the virtual page 1-1 and the physical page 3-1 into which the page data is read correspond to each other (Step 308).

Set the number indicative of allocation of the physical page 3-1 to the device number 2-2 in the page table 12 (Step 309).

Clear the reception side computer ID 23-1 and the transmitted page number 23-2 in the transmitted page table 23 for page-in (Step 310).

Figure 2:
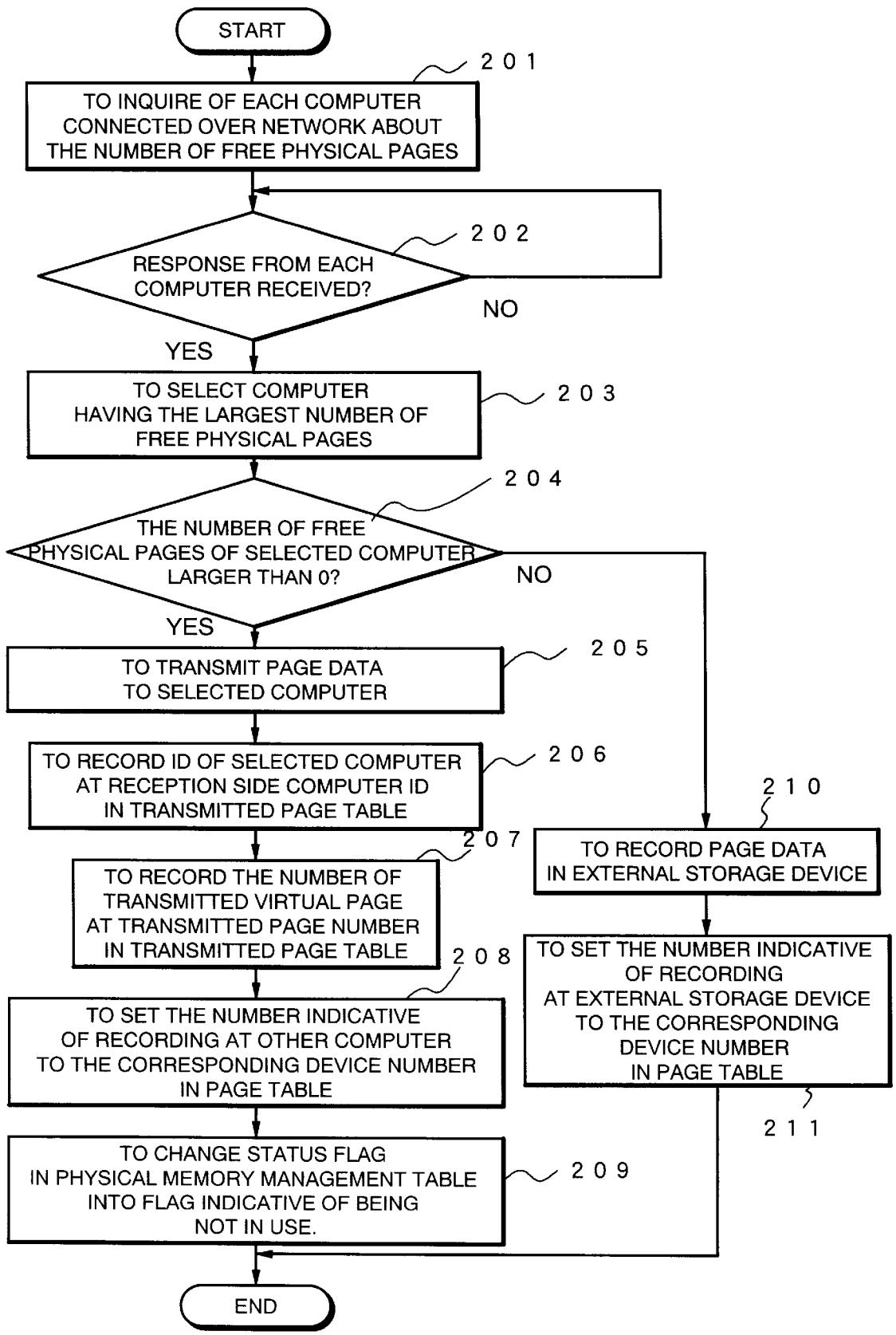
FIG. 2 is a flow chart showing operation of a computer which conducts paging at the time of page-out processing according to the embodiment of the present invention.
Figure 3:
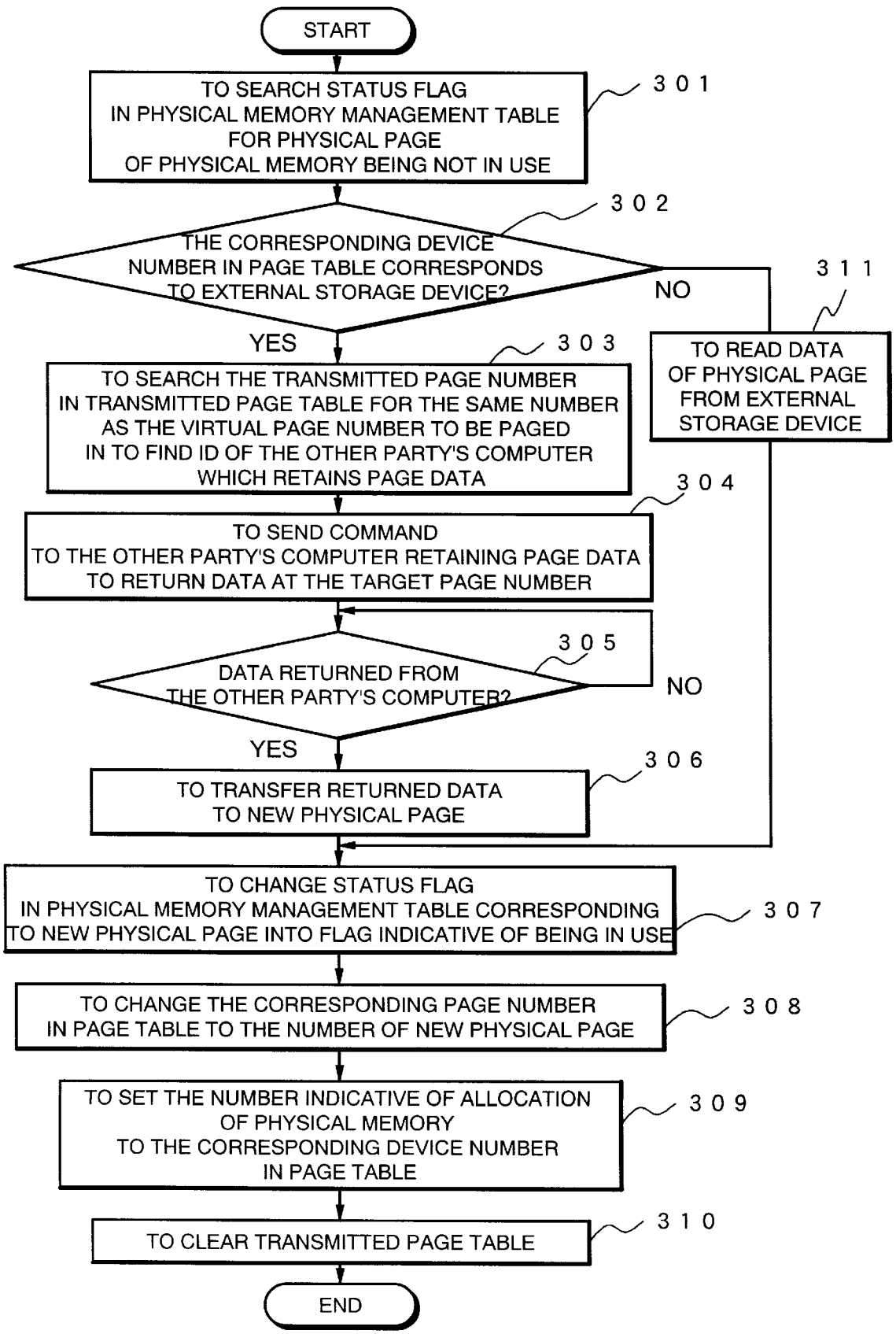
FIG. 3 is a flow chart showing operation of a computer which conducts paging at the time of page-in processing according to the embodiment of the present invention.
Figure 4:
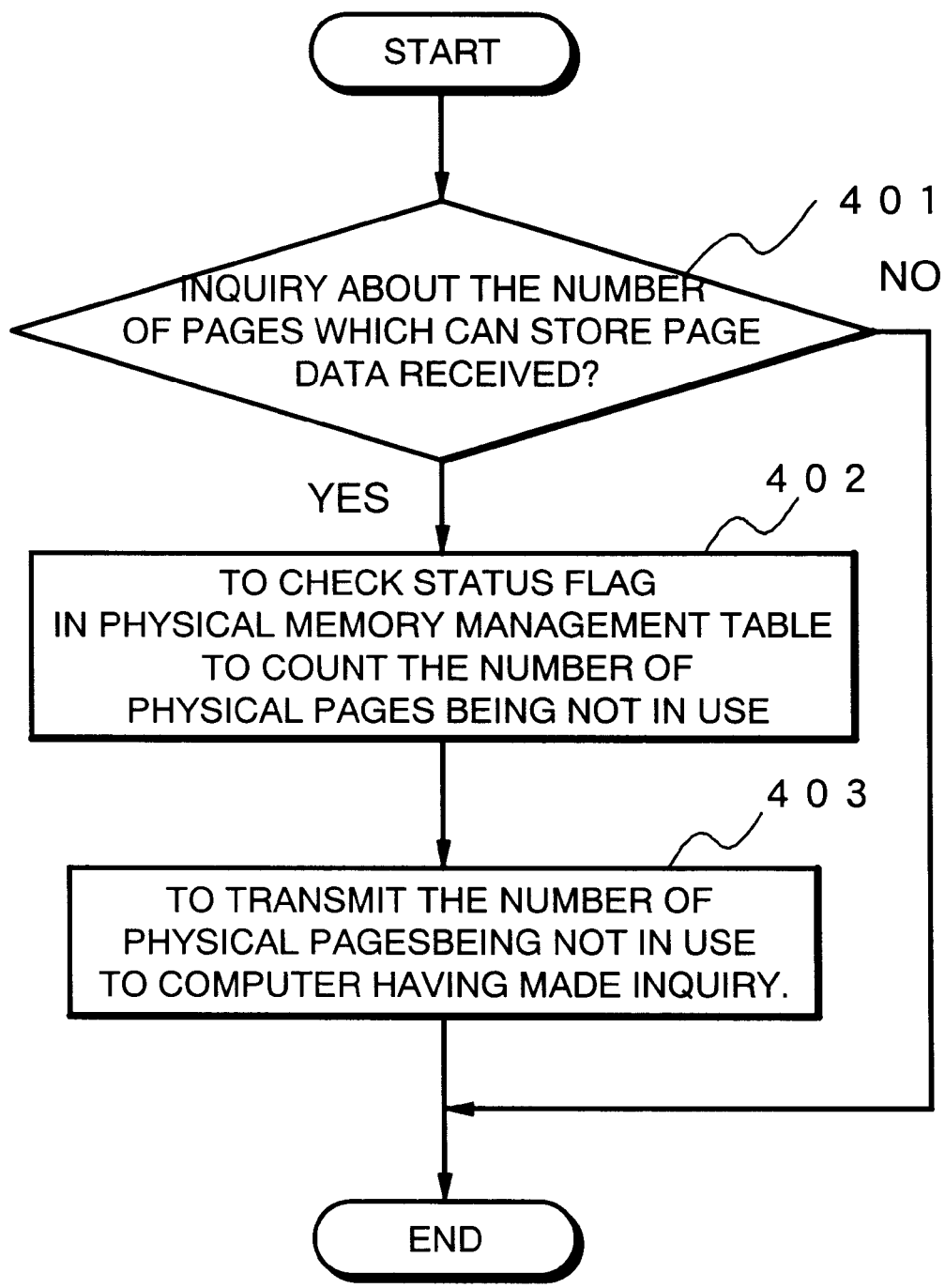
FIG. 4 is a flow chart showing operation of a computer which retains page data at the time of notification of the number of free physical pages according to the embodiment of the present invention.
Figure 5:
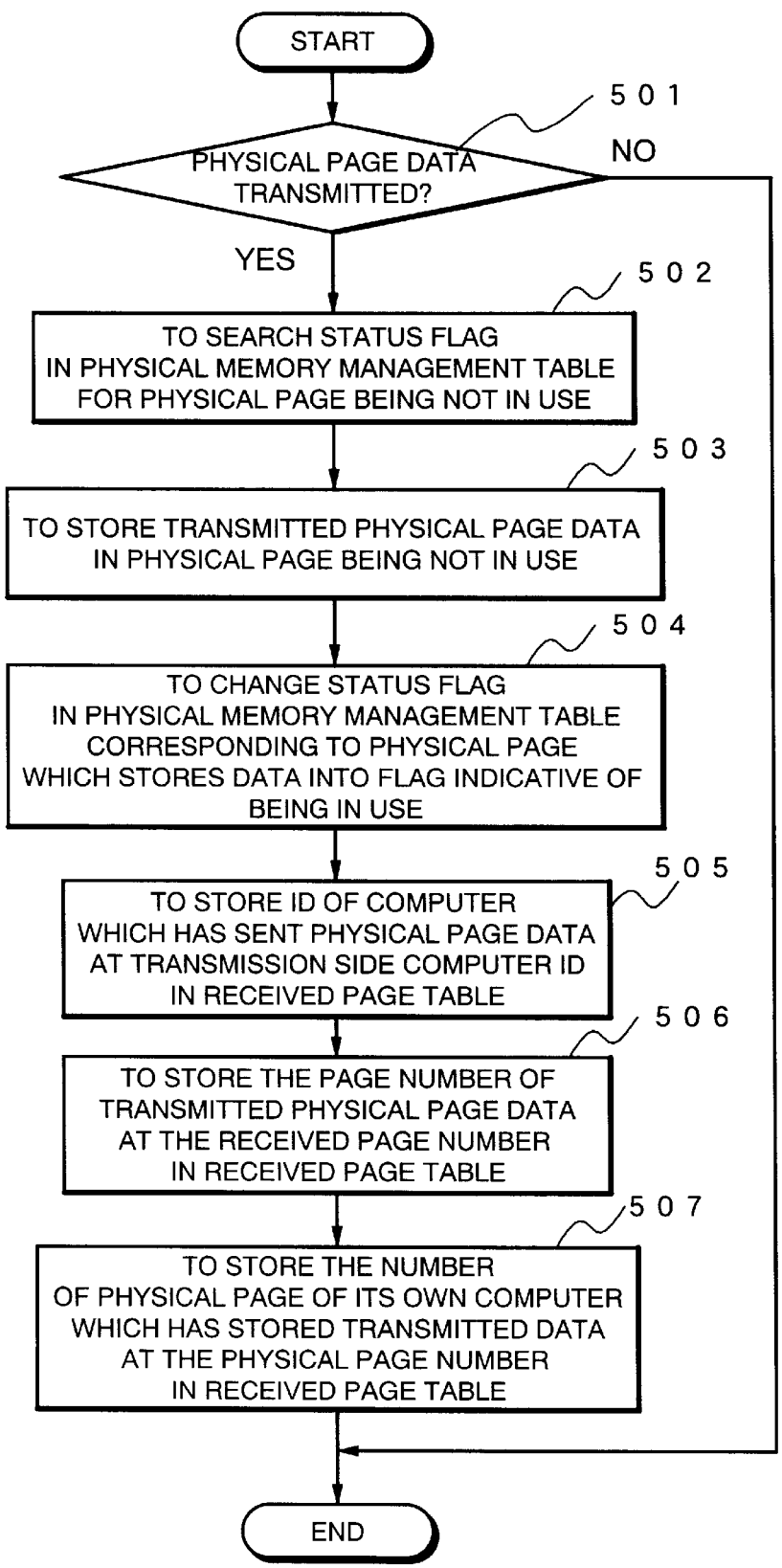
FIG. 5 is a flow chart showing operation of a computer which retains page data at the time of page data reception according to the embodiment of the present invention.

(c) Operation in Processing of Responding to Inquiry about Number of Free Physical Pages At Step 201 of FIG. 2, a command is issued to a computer connected over the network to inquire how many pages are free out of physical pages for checking a free physical page of each computer. Description will be here made of response processing on the side of a receiver of the command with reference to FIGS. 1 and 4.

The page data reception checking portion 18 monitors whether it has received a command to inquire about the number of free pages from the network connection device 24. Without the inquiry, skip the processing to the end (Step 401).

Then, the page data reception checking portion 18 searches the status flag 4-1 in the physical memory management table 14 to count the number of free physical pages 3-1 (Step 402).

Transmit the number of physical pages counted at the above step to the computer having made the inquiry (Step 403).

(d) Page Data Reception Processing

At Step 205 of FIG. 2, the page data transmission/reception portion 22 transmits page data to a selected computer through the network connection device 24. Description will be here made of page data reception processing on the side of the selected computer with reference to FIGS. 1 and 5.

The page data reception/transmission portion 19 monitors whether page data has been transferred from the network connection device 24. If no page data has been transferred, skip the processing to the end (Step 501).

The page data reception/transmission portion 19 searches the status flag 4-1 in the physical memory management table 14 for a free physical page 3-1 (Step 502).

Store the transmitted page data in the free physical page searched at the above Step 502 (Step 503).

Furthermore, change the status flag 4-1 in the physical memory management table 14 corresponding to the physical page into a flag indicative of being in use (Step 504).

Record an ID of the computer which has transmitted the page data at the transmission side computer ID 20-1 in the received page table 20 (Step 505).

Record the page number of the virtual page of the computer which has transmitted the page data at the received page number 20-2 in the received page table 20 (Step 506).

Record the number of the physical page of its own computer which has stored the transmitted page data at Step 503 at the physical page number in the received page table 20 (Step 507).

(e) Page Data Returning Processing

Figure 6:
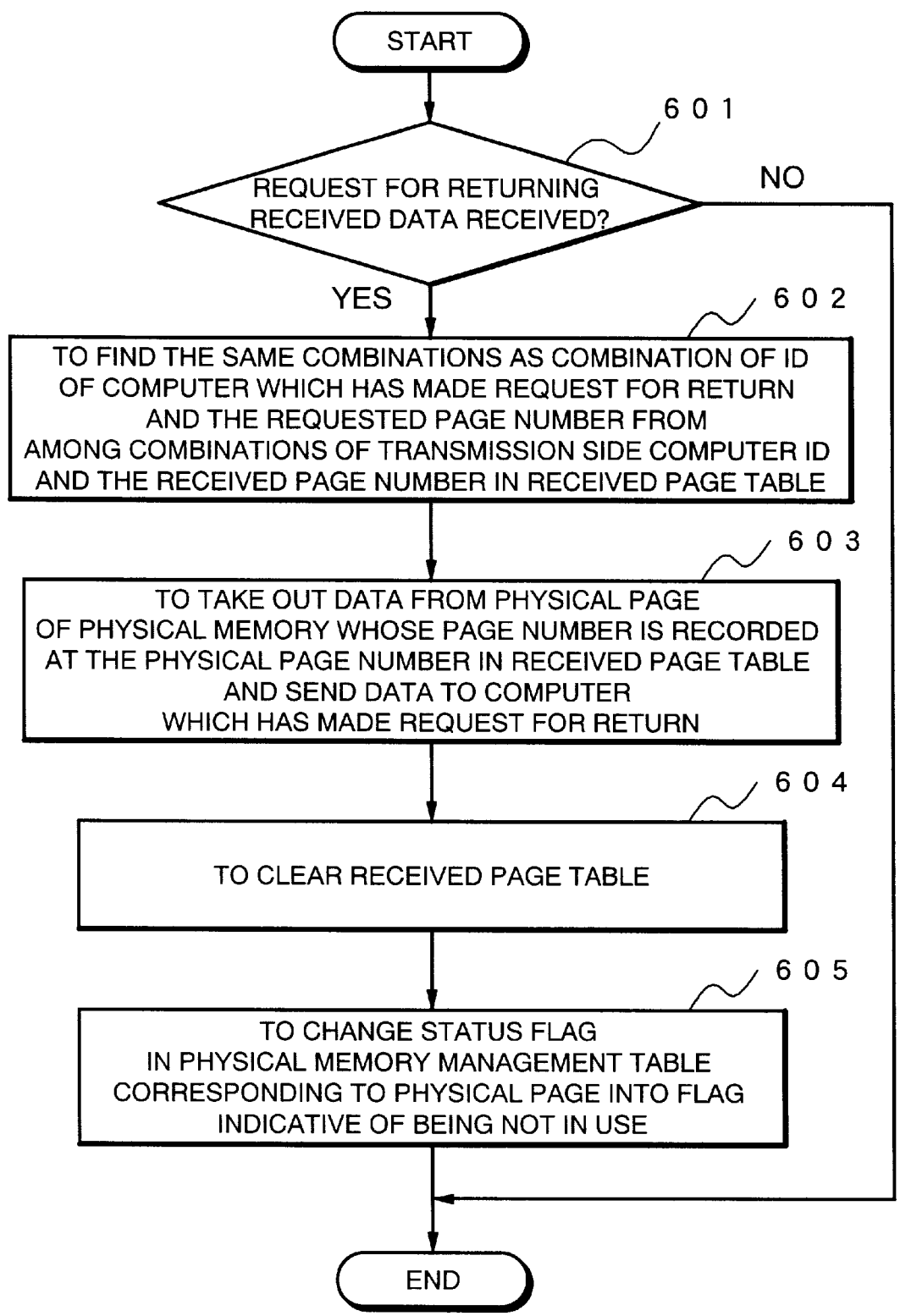
FIG. 6 is a flow chart showing operation of a computer which retains page data at the time of return of page data according to the embodiment of the present invention.

Description will be made of processing of returning data received through the page data reception processing with reference to FIGS. 1 and 6. The present processing is the one conducted in response to a command to return issued at Step 304 in page-in processing shown in FIG. 3.

The page data reception/transmission portion 19 monitors whether a request for returning page data has arrived from the network connection device 24. Without the request, skip the processing to the end (Step 601).

The return requesting command contains an ID of a computer which has issued this command and the number of a page to be returned (the virtual page number in the computer which has transmitted the command). Find the same combination as that mentioned above from among the combinations of the transmission side computer ID 20-1 and the received page number 20-2 in the received page table 20 (Step 602).

Send out data of the physical page 3-1 recorded at the physical page number 20-3 corresponding to the combination in the table found at the above Step 602 to the computer which has made the request through the network connection device 24 (Step 603).

Clear the transmission side computer ID 20-1, the received page number 20-2 and the physical page number 20-3 in the received page table 20 whose return has been completed (Step 604).

Furthermore, clear the status flag 4-1 in the physical memory management table 14 corresponding to the physical page returned at Step 603 (Step 605).

Figure 7:
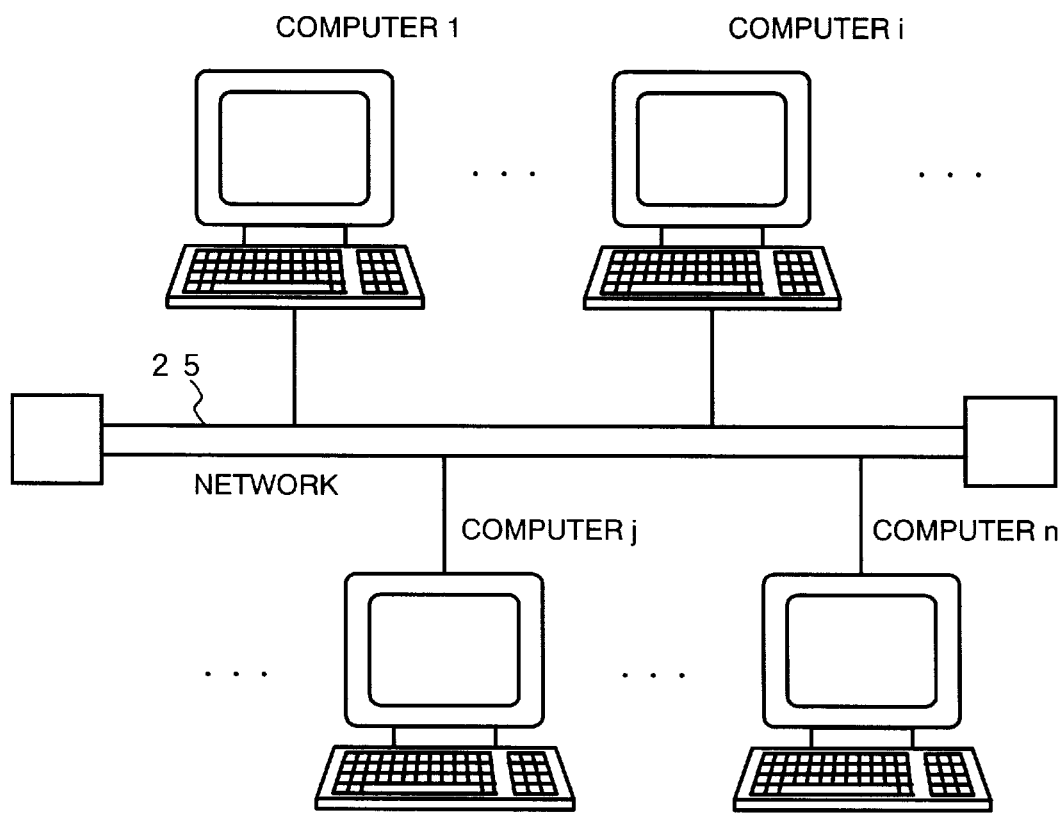
FIG. 7 is a diagram showing structure of a network system composed of computers to which the present invention is applied.

Next, the embodiment of the present invention will be detailed. As illustrated in FIG. 7, it is assumed that a number n of computers are connected to the network 25. Consideration will be given to a case where a program requiring a large amount of memory is run on the computer i out of these computers to cause a shortage of physical memory.

If more virtual memory is needed than the capacity of the physical memory which the computer i has, a free physical page should be created by paging out the contents of a physical page corresponding to a virtual page which has not been recently accessed on a page basis. In conventional art, paged out data is retained in an external storage device as a page-out destination whose access speed is far lower than that of such a memory as a hard disk. In the present invention, retaining paged out data in a physical memory of other computer connected over the network realizes higher-speed paging.

(a) Processing at Page-out

First, the page data transmission checking portion 21 of the computer i issues a command to inquire about the number of free physical pages to other computer.

Upon receiving the command, the page data reception checking portion 18 of other computer searches the status flag 4-1 in the physical memory management table 14 in its own computer, counts the number of physical pages being not in use and notifies the computer i of the counted number.

First, the page data transmission checking portion 21 of the computer i waits for a response from other computer and at a time point of receiving responses from all the computers, selects a computer having the largest number of free physical pages among these computers. Assume now that a computer having the largest number of free physical pages is the computer j.

Here, if the number of free physical pages of the computer j is "0", it is understood that none of the computers connected over the network has a free physical page. In this case, therefore, the computer i conducts page-out into the external storage device as is done in conventional art.

When the computer j has a free physical page, the page data transmission/reception portion 22 of the computer i transmits page data to the computer j through the network 25. On this occasion, the portion 22 also transmits, to the computer j, an ID of the computer i itself and the number of a virtual page indicating which virtual page on the computer i had the page data. At the same time, this number is also recorded at the transmitted page number 23-2 in the transmitted page table 23. Furthermore, an ID of the computer j is recorded at the reception side computer ID 23-1.

In addition, determine the number indicating whether a virtual page corresponds to a physical page or it is paged out and when it is paged out, whether page-out is directed to an external storage device or to other computer on the network and update the corresponding device number 2-1 in the page table 12 corresponding to the virtual page with the determined value.

The page data reception/transmission portion 18 of the computer j stores the page data sent from the computer i in the physical page of its own computer. First, the portion 18 searches the status flag 4-1 in the physical memory management table 14 for a physical page being not in use and stores the transmitted page data in this physical page. At the same time, change the status flag 4-1 into the flag indicative of being in use. Moreover, record the ID of the computer i at the transmission side computer ID 20-1 in the received page table 20 and the virtual page number of the computer i corresponding to the sent page data at the received page number 20-2. At the physical page number 20-3, record the page number of the physical page in which the page data is stored.

The foregoing page-out processing ensures a free physical page in the computer i to enable allocation of the page to another virtual page.

(b) Processing at Page-in

When the need of reference/updating of data of a paged out virtual page arises, it will be necessary to read the paged out page data into another free physical page and make this physical page and the virtual page correspond to each other.

Assume now that paged-out page data is to be paged in into the computer i.

First, it is necessary to ensure a free physical page for re-storing page data on the computer i. Then, search the status flag 4-1 in the physical memory management table 14 for a physical page not in use. If there exists no free physical page, once conduct page-out processing to create a free physical page.

With reference to the corresponding device number 2-1 in the page table 12 corresponding to a virtual page to be paged in, determine whether page data of this virtual page is being paged out into the external storage device or being paged out into another computer on the network. It the data is being paged out into the external storage device, conduct page-in processing as is done in conventional art.

If the page data is being paged out into a computer on the network, the page data transmission/reception portion 22 searches the transmitted page number 23-2 in the transmitted page table 23 for the same number as the virtual page number to be paged in. At the reception side computer ID 23-1 to be paired with the searched number, an ID of a computer holding the page data is registered. It is now assumed that at this ID, the ID of the computer j is registered.

The page data transmission checking portion 21 notifies the computer j of the ID of its own computer and the virtual page number and issues a command to request the return of page data to the computer j through the network.

The page data reception/transmission portion 19 of the computer j searches combinations of the transmission side computer ID 20-1 and the received page number 20-2 in the received page table 20 for a combination of the ID of the computer i which has made a request for page data return and the requested virtual page number. In a physical page at the physical page number 20-3 corresponding to the searched combination, page data whose return is requested exists.

The data reception/transmission portion 19 then sends out the page data of this physical page to the computer i and clears the transmission side computer ID 20-1, the received page number 20-2 and the physical page number 20-3 in the received page table 20. In addition, the portion changes the status flag 14-1 in the physical memory management table 14 corresponding to the freed physical page whose page data has been returned into the flag indicative of being not in use.

The page data transmission/reception portion 22 of the computer i transfers the page data returned from the computer j to the ensured free physical page and changes the status flag 4-1 in the physical memory management table 14 corresponding to this physical page into the flag indicative of being in use.

Furthermore, in order to make the page data transferred to this physical page and the virtual page correspond to each other, set the number of the physical page to the corresponding page number 2-1 in the page table 12 corresponding to this virtual page.

In addition, to the corresponding device number 2-2, set the number indicating that page data of this virtual page exists on the physical page.

Lastly, clear the reception side computer ID 23-1 and the transmitted page number 23-2 unnecessitated in the transmitted page table 23 of the computer i.

The foregoing page-in processing enables page data being paged out into the computer j to be again returned to a physical page on the computer i.

Here, shown as a first modification of the present embodiment is a method of reducing waiting processing of the computer i and free physical page counting processing of other computer.

On the occurrence of page-out, the page data transmission checking portion 21 inquires of each computer connected over the network about a free physical page at Step 201 of FIG. 2 and waits for a response at Step 202. It is assumed here that the computer i is to conduct page-out of 100 pages. In this case, the computer i should conduct waiting 100 times for checking free pages, while at each of the other computers, the page data reception checking portion 18 should conduct counting of the number of free physical pages and notification of the same 100 times, resulting in decreasing efficiency.

In the above-described embodiment, every time the computer i conducts page-out, the page data transmission checking portion 21 sends a command to the page data reception checking portion 18 of other computer and upon receiving the command, the page data reception checking portion 18 of the other computer operates.

Therefore, employed here is a method in which the page data reception checking portion 18 of each of all the computers including the computer i counts the number of free physical pages in its own computer and notifies the page data transmission checking portion 21 of all the computers every fixed time period. The page data transmission checking portion 21, which includes a table of the number of free physical pages where the number of free physical pages of each computer is recorded, updates the table upon receiving the notification.

Now, when the need of page-out processing arises in the computer i, the page data transmission checking portion 21 refers to this table of the number of free physical pages for each computer to select a computer that has the largest number of free physical pages as a computer to which page-out is directed. Assume this computer to be the computer j. The portion 21 then decrements the table of the number of free physical pages corresponding to the selected computer j by "1".

As a result, even when the computer i conducts page-out successively, it will be unnecessary to request the processing of counting the number of free physical pages from each computer each time and accordingly unnecessary to conduct processing of waiting for a response from each computer, whereby page-out processing can be executed at a high speed.

When the computer i conducts page-out to the computer j, the number of free physical pages of the computer j is decremented by "1", while at other computers than the computer i, the table of the number of free physical pages of the computer j is not updated. This will be updated when the page data reception checking portion 18 of the computer j counts the number of free physical pages in its own computer and notifies all the computers every fixed time period.

Furthermore, a second modification of the present embodiment will be described.

Although the page data transmission checking portion 21, when the number of free physical pages of a computer as a destination of page-out is larger than "0" at Step 204, tries page-out to the computer, when the number of free physical pages is extremely small, these free physical pages are very likely to be consumed by the computer itself. If the computer nevertheless accepts page data from other computer, page-out will occur at the computer accepting the data itself, which might result in double page-out to degrade the performance.

The page data reception checking portion 18 is therefore designed to notify other computer, when the number of free physical pages of its own computer is not more than a certain value (e.g. 10 percent of the total number of physical pages), that the number of free physical pages is "0". When the remainder of physical pages in its own computer is few, this arrangement enables occurrence of page-out at its own computer to be restrained by refusing acceptance of page data from other computer to have priority to use the physical pages in its own computer.

It should be noted that the identifier assignment method to the fabric device in the present embodiment of the fabric system can be realized by hardware construction of the frame generating portion 51, the frame receiving portion 52, the identifier assignment portion 53 and other functions of the fabric device. However, it is also possible to be realized by loading the programs having respective functions in the memory of the computer processing system. The computer program may be stored in a magnetic disk, a semiconductor memory and other storage medium. Then the programs are loaded from the storage medium to the computer processing system to control the operation of the computer processing system to realize the foregoing functions, respectively.

As described in the foregoing, the paging processing system in a virtual storage device and the paging processing method thereof according to the present invention have the effects of speeding up paging processing and in large-scale computation involving a physical memory shortage, restraining reduction in computation throughput by retaining, in page data retaining processing, page data in a physical memory of other connected computer without using such an external storage device whose access speed is low as a hard disk.

Although speed-up of paging may be realized by using a high-speed external storage device having none of low-speed mechanisms, for example, using a silicon disk or an extended memory as a virtual disk, this method requires further addition of these high-speed external storage devices and its effects are limited only to a computer on which these devices are mounted. On the other hand, the present invention achieves the effect of improving computer throughput by efficiently using a free physical memory of computers connected over a network etc. to make the most of existing resources without adding a further device. Moreover, this effect can be expected not only of one computer but of every computer connected over the network etc.

In addition, it is possible to make the most of existing resources of computers connected over a network etc. without the need of addition of a special device.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A paging processing system in a virtual storage device of a computer system composed of a plurality of computers connected directly or over a network, comprising:

page data reception checking means for notifying other computer which conducts page-out processing of the number of free physical pages of a physical memory in its own computer;

page data reception/transmission means for conducting processing of receiving page data from other computer and processing of returning received data;

page data transmission checking means for checking a state of vacancy of a physical memory of other computer based on the number of free physical pages notified by said page data reception checking means to select a computer as a page data transmission destination;

page data transmission/reception means for conducting transmission processing of transmitting page data of a virtual page to be paged out to said other computer selected and reception processing when transmitted page data is returned; and page management means for controlling each of said means to manage a correspondence relationship between a virtual page and a physical page.

2. The paging processing system in a virtual storage device as set forth in claim 1, wherein said page data transmission checking means inquires of other computer about the number of free physical pages for paging out a physical page in its own computer, and said page data reception checking means notifies other computer which conducts page-out processing of the number of free physical pages of a physical memory in its own computer according to said inquiry.

3. The paging processing system in a virtual storage device as set forth in claim 1, wherein said page data reception checking means notifies every other computer of the number of free physical pages of a physical memory in its own computer every fixed time period.

4. The paging processing system in a virtual storage device as set forth in claim 1, wherein said page data transmission checking means compares states of vacancy of physical memories in other computers based on the numbers of free physical pages notified by said page data reception checking means to select one of the other computers having the largest number of free physical pages as a page data transmission destination computer.

5. The paging processing system in a virtual storage device as set forth in claim 1, wherein said page data transmission checking means inquires of other computer about the number of free physical pages for paging out a physical page in its own computer, said page data reception checking means notifies other computer which conducts page-out processing of the number of free physical pages of a physical memory in its own computer according to said inquiry, and said page data transmission checking means compares states of vacancy of physical memories in other computers based on the numbers of free physical pages notified by said page data reception checking means to select one of the other computers having the largest number of free physical pages as a page data transmission destination computer.

6. The paging processing system in a virtual storage device as set forth in claim 1, wherein said page data reception checking means notifies every other computer of the number of free physical pages of a physical memory in its own computer every fixed time period, and said page data transmission checking means compares states of vacancy of physical memories in other computers based on the numbers of free physical pages notified by said page data reception checking means to select one of the other computers having the largest number of free physical pages as a page data transmission destination computer.

7. The paging processing system in a virtual storage device as set forth in claim 1, wherein said page data reception checking means, when notifying other computer which conducts page-out processing of the number of free physical pages of a physical memory in its own computer, notifies that no free physical page exists if said number of free physical pages is not more than a fixed value.

8. The paging processing system in a virtual storage device as set forth in claim 1, further comprising:

a page table for recording identification information of a paged out virtual page and a page-out destination, a received page table for recording the identification number of a computer which has transmitted page data by page-out processing, the number of a virtual page of the computer which has transmitted the page data, and the number of a physical page in its own computer which stores the transmitted page data, and a transmitted page table for recording the identification number of a computer which has received page data and the number of a virtual page whose page data has been transmitted, wherein in page-out processing, said page data transmission/reception means transmits, to other computer selected, the identification number of its own computer and the number of a virtual page to be paged out as well as page data and records, at said transmitted page table, the identification number of the computer having received the page data and the number of a virtual page whose page data has been transmitted, and said page management means records, at the page-out destination identification information corresponding to a paged out virtual page in said page table, information indicating that page data is stored in other computer.

9. The paging processing system in a virtual storage device as set forth in claim 8, wherein in page-in processing, said page data transmission/reception means specifies other computer which stores page data based on page-out destination identification information of said virtual page paged out in said page table and said transmitted page table, makes a request to the specified other computer to return said page data, with the identification number of its own computer and the number of a virtual page corresponding to the page data whose return is requested designated, and transfers said page data returned to a free physical page in its own computer, as well as clearing the identification number of the computer having received the page data and the number of the virtual page whose page data has been transmitted in said transmitted page table.

10. The paging processing system in a virtual storage device as set forth in claim 8, wherein page said data reception/transmission means of the computer selected to receive the page data stores the transmitted page data in a free physical page of its own computer and records, in said received page table, the identification number of the computer which has transmitted the page data, the virtual page number of the computer which has transmitted the page data and the physical page number of its own computer which stores the page data.

11. The paging processing system in a virtual storage device as set forth in claim 8, wherein said page data reception/transmission means of the computer requested to return said page data searches said received page table for a combination of the identification number of the computer and the number of a virtual page corresponding to the page data whose return is requested contained in the request for return, transmits data stored at the corresponding physical page number in said received page table to said computer having made a request for return and after the completion of returning, clears the corresponding contents in said received page table.

12. A paging processing method in a virtual storage device of a computer system composed of a plurality of computers connected directly or over a network, comprising the steps of:

notifying other computer which conducts page-out processing of the number of free physical pages of a physical memory in its own computer;

checking out a state of vacancy of a physical memory of other computer based on the notified number of free physical pages to select a computer as a page data transmission destination;

transmitting page data of a virtual page to be paged out to said other computer selected;

managing a correspondence relationship between a virtual page and a physical page; and notifying every other computer of the number of free physical pages of a physical memory in its own computer every fixed time period.

13. A paging processing method in a virtual storage device of a computer system composed of a plurality of computers connected directly or over a network, comprising the steps of:

notifying other computer which conducts page-out processing of the number of free physical pages of a physical memory in its own computer;

checking out a state of vacancy of a physical memory of other computer based on the notified number of free physical pages and inquiring of other computer about the number of free physical pages for paging out a physical page in its own computer;

notifying other computer which conducts page-out processing of the number of free physical pages of a physical memory in its own computer according to said inquiry;

selecting a computer as a page data transmission destination;

transmitting page data of a virtual page to be paged out to said other computer selected; and managing a correspondence relationship between a virtual page and a physical page.

14. A paging processing method in a virtual storage device of a computer system composed of a plurality of computers connected directly or over a network, comprising the steps of:

notifying other computer which conducts page-out processing of the number of free physical pages of a physical memory in its own computer;

checking out a state of vacancy of a physical memory of other computer based on the notified number of free physical pages and comparing states of vacancy of physical memories in other computers based on the notified numbers of free physical pages to select one of the other computers having the largest number of free physical pages as a page data transmission destination computers;

transmitting page data of a virtual page to be paged out to said other computer selected; and managing a correspondence relationship between a virtual page and a physical page.

15. A paging processing method in a virtual storage device of a computer system composed of a plurality of computers connected directly or over a network, comprising the steps of:

notifying other computer which conducts page-out processing of the number of free physical pages of a physical memory in its own computer;

inquiring of other computer about the number of free physical pages for paging out a physical page in its own computer, notifying other computer which conducts page-out processing of the number of free physical pages of a physical memory in its own computer according to said inquiry, and comparing states of vacancy of physical memories in other computers based on the notified numbers of free physical pages to select one of the other computers having the largest number of free physical pages as a page data transmission destination computer;

transmitting page data of a virtual page to be paged out to said other computer selected; and managing a correspondence relationship between a virtual page and a physical page.

16. A paging processing method in a virtual storage device of a computer system composed of a plurality of computers connected directly or over a network, comprising the steps of:

notifying other computer which conducts page-out processing of the number of free physical pages of a physical memory in its own computer;

checking out a state of vacancy of a physical memory of other computer based on the notified number of free physical pages;

notifying every other computer of the number of free physical pages of a physical memory in its own computer every fixed time period;

comparing states of vacancy of physical memories in other computers based on the notified numbers of free physical pages to select one of the other computers having the largest number of free physical pages as a page data transmission destination computers;

transmitting page data of a virtual page to be paged out to said other computer selected; and managing a correspondence relationship between a virtual page and a physical page.

17. A paging processing method in a virtual storage device of a computer system composed of a plurality of computers connected directly or over a network, comprising the steps of:

notifying other computer which conducts page-out processing of the number of free physical pages of a physical memory in its own computer, notifying that no free physical page exists if said number of free physical pages is not more than a fixed values;

checking out a state of vacancy of a physical memory of other computer based on the notified number of free physical pages to select a computer as a page data transmission destination;

transmitting page data of a virtual page to be paged out to said other computer selected; and managing a correspondence relationship between a virtual page and a physical page.

18. A paging processing method in a virtual storage device of a computer system composed of a plurality of computers connected directly or over a network, comprising a page table for recording identification information of a paged out virtual page and a page-out destination, a received page table for recording the identification number of a computer which has transmitted page data by page-out processing, the number of a virtual page of the computer which has transmitted the page data, the number of a physical page in its own computer which stores the transmitted page data, and a transmitted page table for recording the identification number of a computer which has received page data and the number of a virtual page whose page data has been transmitted, the page processing method comprising the steps of:

notifying other computer which conducts page-out processing of the number of free physical pages of a physical memory in its own computer;

checking out a state of vacancy of a physical memory of other computer based on the notified number of free physical pages to select a computer as a page data transmission destination;

transmitting page data of a virtual page to be paged out to said other computer selected; and managing a correspondence relationship between a virtual page and a physical page;

wherein, in page-out processing, transmitting, to other computer selected, the identification number of its own computer and the number of a virtual page to be paged out as well as page data and records, at said transmitted page table, the identification number of the computer having received the page data and the number of a virtual page whose page data has been transmitted, and at the page-out destination identification information corresponding to a paged out virtual page in said page table, recording information indicating that page data is stored in other computer.

19. The paging processing method in a virtual storage device as set forth in claim 18, further comprising the step of, in page-in processing, specifying other computer which stores page data based on page-out destination identification information of said virtual page paged out in said page table and said transmitted page table, makes a request to the specified other computer to return said page data, with the identification number of its own computer and the number of a virtual page corresponding to the page data whose return is requested designated, and transfers said page data returned to a free physical page in its own computer, as well as clearing the identification number of the computer having received the page data and the number of the virtual page whose page data has been transmitted in said transmitted page table.

20. The paging processing method in a virtual storage device as set forth in claim 18, wherein on the computer selected to receive the page data, the transmitted page data is stored in a free physical page of its own computer, and the identification number of the computer which has transmitted the page data, the virtual page number of the computer which has transmitted the page data and the physical page number of its own computer which stores the page data are recorded in said received page table.

21. The paging processing method in a virtual storage device as set forth in claim 18, wherein the computer requested to return said page data searches said received page table for a combination of the identification number of the computer contained in the request for return and the number of a virtual page corresponding to the page data whose return is requested, transmits data stored at the corresponding physical page number in said received page table to said computer having made a request for return and after the completion of returning, clears the corresponding contents in said received page table.

* * * * *